(12) United States Patent
Thor et al.

(10) Patent No.: US 7,608,012 B2
(45) Date of Patent: Oct. 27, 2009

(54) RESOLVING A NON-COMMANDED NEUTRAL STATE IN A CLUTCH-TO-CLUTCH TRANSMISSION

(75) Inventors: Todd J. Thor, Byron, MI (US); David W. Wright, Howell, MI (US); Brian J. Pellerito, Ortonville, MI (US); Craig A. Brunstetter, Marysville, OH (US)

(73) Assignee: GM Global Technology Operations, Inc., Detroit, MI (US)

( * ) Notice: Subject to any disclaimer, the term of this patent is extended or adjusted under 35 U.S.C. 154(b) by 398 days.

(21) Appl. No.: 11/589,693

(22) Filed: Oct. 30, 2006

(65) Prior Publication Data
US 2007/0249462 A1    Oct. 25, 2007

Related U.S. Application Data

(60) Provisional application No. 60/794,794, filed on Apr. 25, 2006.

(51) Int. Cl.
*F16H 59/60* (2006.01)
*F16H 61/00* (2006.01)
*G06F 7/00* (2006.01)

(52) U.S. Cl. .............. 477/97; 477/148; 701/66

(58) Field of Classification Search ............ 477/97, 477/125, 143, 148, 906; 701/57, 62, 64, 701/66
See application file for complete search history.

(56) References Cited

U.S. PATENT DOCUMENTS

| 5,016,174 | A  | * | 5/1991  | Ito et al. ............ 701/62 |
| 5,408,895 | A  | * | 4/1995  | Chan et al. ............ 74/335 |
| 5,650,932 | A  | * | 7/1997  | Chan et al. ............ 701/62 |
| 5,873,281 | A  | * | 2/1999  | Stasik et al. ............ 74/335 |
| 6,257,082 | B1 | * | 7/2001  | Ore ............ 74/336 R |
| 6,263,274 | B1 | * | 7/2001  | Shim ............ 701/62 |
| 6,412,361 | B1 | * | 7/2002  | Wolf et al. ............ 74/336 R |
| 6,558,293 | B2 | * | 5/2003  | Skupinski et al. ............ 477/97 |
| 6,819,987 | B2 | * | 11/2004 | Depping et al. ............ 701/29 |
| 7,421,326 | B2 | * | 9/2008  | Thor et al. ............ 701/67 |

* cited by examiner

*Primary Examiner*—Roger Pang

(57) ABSTRACT

A method of controlling a clutch-to-clutch transmission. The method includes detecting transmission slip speed that exceeds a predetermined amount for a predetermined time period. Based on the detecting, a shift of a gear ratio of the transmission is forced. When this method is implemented in a vehicle, loss of driver control of the vehicle can be prevented in the event of a non-commanded neutral condition in the transmission.

17 Claims, 2 Drawing Sheets

RESOLVING A NON-COMMANDED NEUTRAL STATE IN A CLUTCH-TO-CLUTCH TRANSMISSION

CROSS-REFERENCE TO RELATED APPLICATIONS

This application claims the benefit of U.S. Provisional Application No. 60/794,794, filed on Apr. 25, 2006. The disclosure of the above application is incorporated herein by reference.

FIELD

The present disclosure relates to clutch-to-clutch automatic transmissions and more particularly (but not exclusively) to resolving non-commanded neutral gear states in clutch-to-clutch transmissions.

BACKGROUND

The statements in this section merely provide background information related to the present disclosure and may not constitute prior art.

In a vehicle powertrain having a clutch-to-clutch automatic transmission, a plurality of clutches can be selectively engaged and disengaged to provide speed ratios between input and output shafts of the transmission. Most speed ratios may be established by placing two clutches "on", i.e., on holding torque. Shifting from one speed ratio to another speed ratio involves lowering the torque capacity of an off-going clutch and increasing capacity of an oncoming clutch. If a clutch or hydraulic circuit loses pressure while the clutch is in use, a neutral gear state may result.

SUMMARY

The present disclosure, in one implementation, is directed to a vehicle including a transmission having a plurality of clutches for providing a plurality of speed ratios. The vehicle includes a control module that monitors slip speed in a gear state of the transmission. Based on the monitoring, the control module forces a shift of the transmission to a different gear state.

In another implementation, the disclosure is directed to a method of controlling a transmission having a plurality of clutches for providing a plurality of speed ratios. The method includes detecting transmission slip speed that exceeds a predetermined amount for a predetermined time period. Based on the detecting, a shift of a gear ratio of the transmission is forced.

In yet another implementation, the disclosure is directed to a transmission control system for a clutch-to-clutch transmission. The control system includes a control module configured to detect transmission slip speed that exceeds a predetermined amount for a predetermined time period. Based on the detecting, the control module forces a shift of a gear ratio of the transmission.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 1:
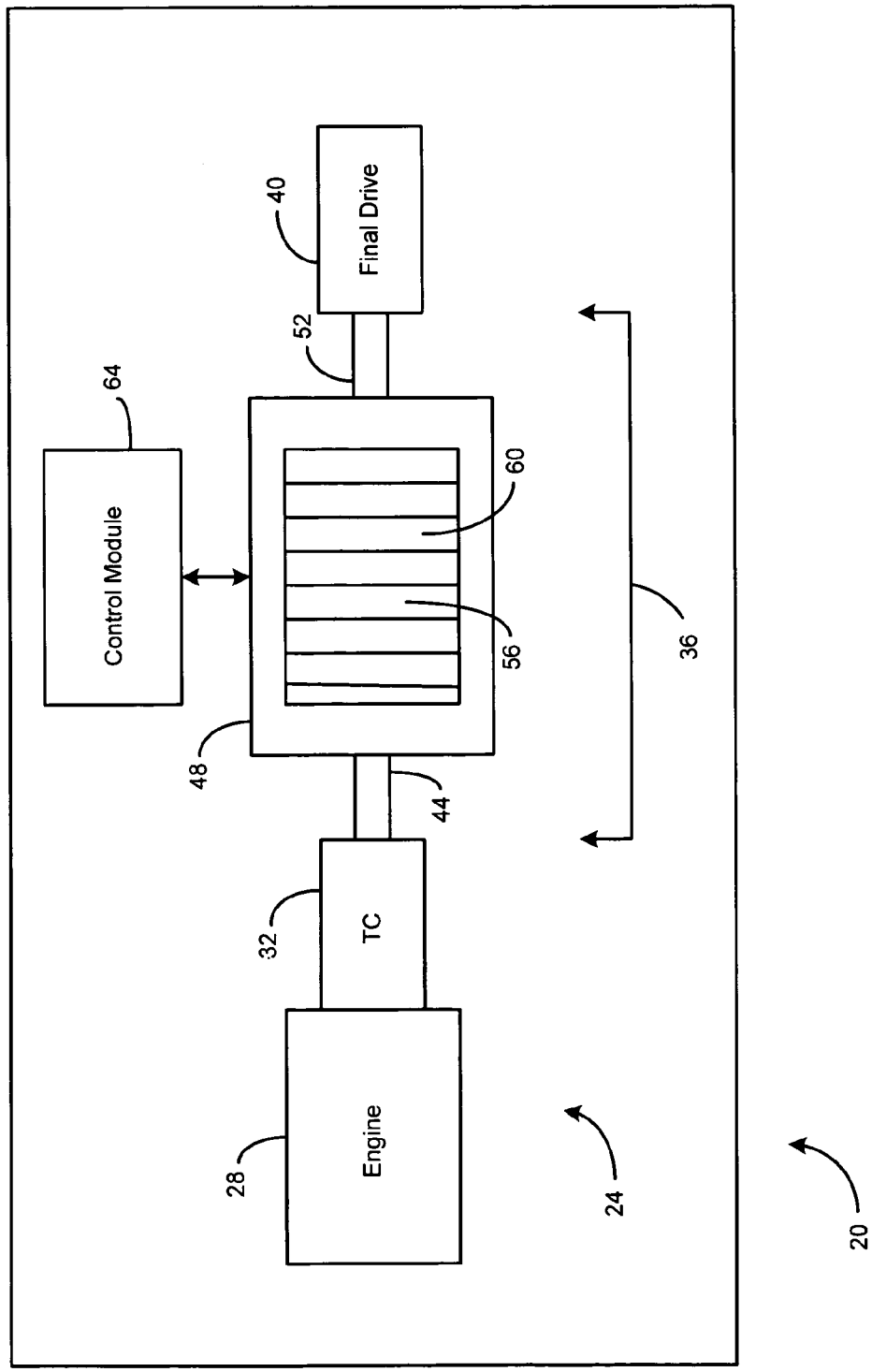
Figure 2:
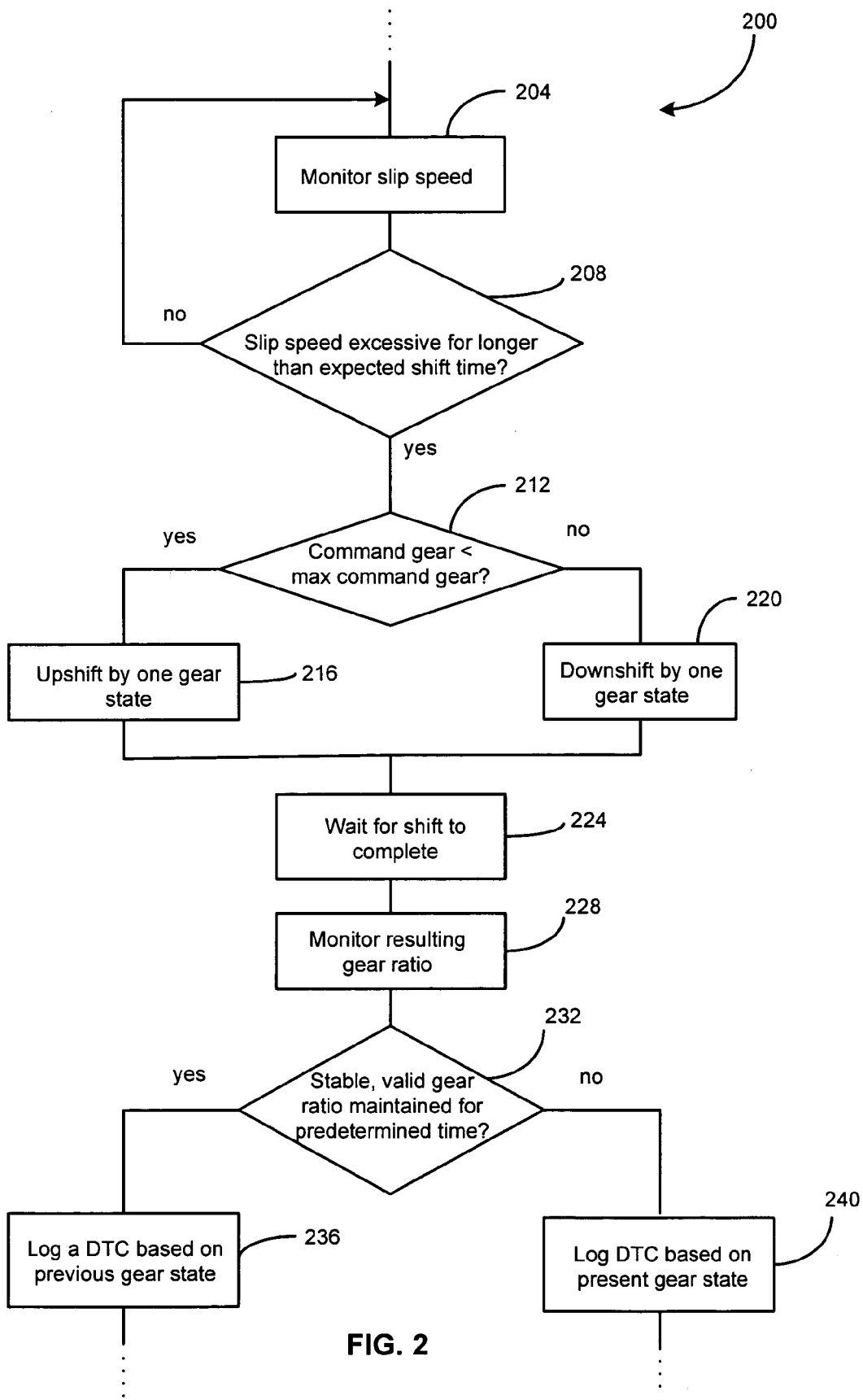

FIG. 1 is a conceptual diagram of a vehicle including a transmission and transmission control system in accordance with one implementation of the disclosure; and FIG. 2 is a flow diagram of a method of controlling a transmission in accordance with one implementation of the disclosure.

DETAILED DESCRIPTION

The following description is merely exemplary in nature and is not intended to limit the present disclosure, application, or uses. As used herein, the term module and/or device refers to an application specific integrated circuit (ASIC), an electronic circuit, a processor (shared, dedicated, or group) and memory that execute one or more software or firmware programs, a combinational logic circuit, or other suitable components that provide the described functionality.

A vehicle in accordance with one implementation of the disclosure is indicated generally in FIG. 1 by reference number 20. The vehicle 20 includes a powertrain, indicated generally by reference number 24. The powertrain 24 includes an engine 28, a torque converter 32, a transmission 36, and a final drive mechanism 40. The transmission 36 includes an input shaft 44, a gearbox 48 and an output shaft 52. The transmission 36 is a clutch-to-clutch transmission. Accordingly, the gearbox 48 includes a plurality of gears 56 and a plurality of clutches 60. It should be noted that various implementations of the present disclosure can be practiced in connection with various powertrains and various types of clutch-to-clutch transmissions. The transmission 36 is controlled by a control module 64 which may be or reside in, e.g., a powertrain controller and/or engine controller. It should be understood that the control module 64 could be incorporated in a transmission control system or in other or additional control systems of the vehicle 20.

When the vehicle 20 is in operation, energy produced by the engine 28 is converted into drive torque in the torque converter 32. Drive torque is transferred through the transmission 36 to the final drive 40 and driven wheels of the vehicle 20. Clutches 60 are selectively engaged and disengaged to provide, via gears 56, various speed ratios between the input shaft 44 and the output shaft 52. When a shift from one speed ratio to another is commanded through the control module 64, typically an engaged clutch 60 is commanded to become disengaged while a disengaged clutch 60 is commanded to become engaged.

Slip speed, also called gearbox slip, may be defined according to the following relationship:

$$\text{slip speed} = Ni - GR(No) \qquad (1)$$

where Ni represents speed of the transmission input shaft 44, GR represents gear ratio, and No represents speed of the transmission output shaft 52. For example, where a first-gear gear ratio equals 4.027, Ni is measured as 857 RPM, and No is measured as 212 RPM, slip speed equals 3.276 RPM. Generally, an excessive slip speed for a significant period of time may indicate that a transmission is not maintaining a correct gear ratio for the commanded gear. In other words, a non-commanded neutral condition may be developing or present.

In one implementation of the disclosure, the control module 64 monitors slip speed in a gear state of the transmission 36. Based on the monitoring, the control module 64 forces a shift of the transmission 36 to a different gear state. A method of controlling a transmission having a plurality of clutches for providing a plurality of speed ratios is indicated generally in FIG. 2 by reference number 200. It can be appreciated by those skilled in the art that the flow diagram of FIG. 2 is only exemplary, and that various aspects of the implementation could be iterated and/or arranged in various ways to provide the described functionality.

The method 200 shall be described with reference to the vehicle 20. In step 204, the control module 64 monitors slip speed of the transmission 36. In step 208 it is determined whether a difference between a commanded gear slip and gear slip attained by the transmission 36 exceeds a predetermined amount over a time period longer than an expected shift time. An expected shift time may be defined as an expected time period over which a shift of the transmission 36 to the commanded gear would be completed. If the slip speed is determined in step 208 not to be excessive, control returns to step 204. If slip speed is determined in step 208 to be excessive, then in step 212 it is determined whether the commanded gear is less than a maximum command gear. If the commanded gear is less than the maximum command gear, then in step 216 the control module 64 forces an upshift of the transmission 36 by one gear state. For example, if fourth gear is commanded, the control module forces an upshift to fifth gear. If the commanded gear is the maximum command gear, then in step 220 the control module 64 forces a downshift of the transmission 36 by one gear state.

In step 224 the control module 64 waits for a predetermined time period to allow the forced shift to complete, e.g., to allow clutches 60 to reach full capability after the forced shift. In step 228 the control module 64 monitors a gear ratio resulting from the forced shift. In step 232 it is determined whether a stable, valid gear ratio is maintained for a predetermined time period. If the result is yes in step 232, then in step 236 the control module 64 issues a diagnostic indicating that a non-commanded neutral condition occurred in the previous gear state. If the result is no in step 232, then in step 240 the control module 64 issues a diagnostic indicating occurrence of a non-commanded neutral condition in the current gear state.

When the foregoing system and/or method are implemented in a vehicle, loss of driver control of the vehicle can be prevented in the event of a non-commanded neutral condition in the transmission. Implementations of the present disclosure make it possible for failed components to be automatically detected. Furthermore, implementations of the disclosure make it possible for actions to be taken automatically to maintain driver safety, even in the presence of component failure.

While various configurations of the disclosure have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A vehicle including a transmission having a plurality of clutches for providing a plurality of speed ratios, the vehicle comprising a control module that:
   monitors a difference between speed of an input shaft of the transmission and speed of an output shaft of the transmission in a gear state of the transmission for an expected shift time; and
   based on the monitoring and a gear ratio of the gear state, forces a shift of the transmission to a different gear state if the difference exceeds a predetermined amount for longer than the expected shift time.

2. The vehicle of claim 1 wherein the control module forces an upshift or a downshift based on a currently commanded gear.

3. The vehicle of claim 2 wherein the control module forces an upshift to by one gear state if the currently commanded gear is less than a maximum command gear.

4. The vehicle of claim 2 wherein the control module forces a downshift to by one gear state if the currently commanded gear equals a maximum command gear.

5. The vehicle of claim 1 wherein the control module:
   monitors a resulting gear ratio in the different gear state; and
   issues a diagnostic based on the resulting gear ratio.

6. A method of controlling a transmission having a plurality of clutches for providing a plurality of speed ratios, the method comprising:
   detecting when a difference between speed of an input shaft of the transmission and a product of speed of an output shaft of the transmission and a gear ratio of the transmission exceeds a predetermined amount for a predetermined time period; and
   based on the detecting, forcing a shift of the gear ratio of the transmission.

7. The method of claim 6 wherein the predetermined time period includes an expected shift time.

8. The method of claim 6 wherein the predetermined amount includes a commanded difference.

9. The method of claim 6 wherein forcing a shift of a gear ratio comprises determining whether the gear ratio is a maximum command gear.

10. The method of claim 9 wherein forcing a shift comprises forcing an upshift or downshift by one gear state.

11. The method of claim 6 further comprising:
    monitoring the shifted gear ratio for a predetermined monitoring time; and
    based on the monitoring, issuing a diagnostic.

12. A transmission control system for a clutch-to-clutch transmission, the control system comprising a control module configured to:
    detect when a difference between speed of an input shaft of the transmission and a product of speed of an output shaft of the transmission and a gear ratio of the transmission exceeds a predetermined amount for a predetermined time period; and
    based on the detecting, forcing a shift of the gear ratio of the transmission.

13. The transmission control system of claim 12 wherein the predetermined time period includes an expected shift time.

14. The transmission control system of claim 12 wherein the predetermined amount includes a commanded difference.

15. The transmission control system of claim 12 wherein said control module forces an upshift or downshift of a gear ratio based on whether the gear ratio is a maximum command gear.

16. The transmission control system of claim 12 wherein said control module forces a shift of a one gear state.

17. The transmission control system of claim 12 wherein said control module monitors the shifted gear ratio for a predetermined monitoring time, and
    based on the monitoring, issues a diagnostic.

* * * * *